United States Statutory Invention Registration [19]

[11] Reg. Number: H678

Baker et al. [43] Published: Sep. 5, 1989

[54] SYSTEM FOR TRANSMITTING LOW FREQUENCY ANALOG SIGNALS OVER AC POWER LINES

[75] Inventors: Steven P. Baker, Powell; Robert L. Durall, Lenoir City; Howard D. Haynes, Knoxville, all of Tenn.

[73] Assignee: The United States of America as represented by the United States Department of Energy, Washington, D.C.

[21] Appl. No.: 79,614

[22] Filed: Jul. 30, 1987

[51] Int. Cl.[4] ..... H04M 11/04
[52] U.S. Cl. ..... 340/310 R
[58] Field of Search ..... 340/310 A, 310 R

[56] References Cited

U.S. PATENT DOCUMENTS 4,300,125 11/1981 Loshing et al. ..... 340/310 A
4,538,136 8/1985 Drabing ..... 340/310 R

OTHER PUBLICATIONS

F. W. Gutzwiller, "Control Networks for the Home," Machine Design, Oct. 20, 1983, pp. 109–112.

*Primary Examiner*—Thomas H. Tarcza
*Assistant Examiner*—Linda J. Wallace
*Attorney, Agent, or Firm*—David E. Breeden; Stephen D. Hamel; Judson R. Hightower

[57] ABSTRACT

A system for transmitting low frequency analog signals over AC power lines using FM modulation. A low frequency analog signal to be transmitted is first applied to a voltage-to-frequency converter where it is converted to a signal whose frequency varies in proportion to the analog signal amplitude. This signal is then used to modulate the carrier frequency of an FM transmitter coupled to an AC power line. The modulation signal frequency range in selected to be within the response band of the FM transmitter. The FM modulated carrier signal is received by an FM receiver coupled to the AC power line, demodulated and the demodulated signal frequency is converted by a frequency-to-voltage converter back to the form of the original low frequency analog input signal.

3 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

$V_{OUT}/V_{IN}$

SYSTEM FOR TRANSMITTING LOW FREQUENCY ANALOG SIGNALS OVER AC POWER LINES

This invention, which is a result of a contract with the U.S. Department of Energy, relates generally to the art of superimposed transmission of electrical signals over existing AC power lines and more specifically to the transmission of analog signals over AC power lines.

BACKGROUND OF THE INVENTION

There are many factories and plants, especially nuclear power plants, in which many items of equipment are installed in containment buildings intended to prevent the spread of contaminants, radioactivity and the like in the event of an accident. These plants include numerous control devices, such as motor operated valves, which must be tested periodically to insure reliable operation, especially during emergency conditions. Thus it becomes necessary to periodically shut the plant down to allow access to the containment area for personnel to test this equipment. In order to minimize plant downtime, especially for auxiliary equipment testing, and to reduce maintenance cost, various proposals have been made to provide permanent diagnostic equipment, such as position sensors, strain gages, flow meters and the like which remain attached to the various control devices, and to provide cabling to a central data acquisition point. For example, a data acquisition point may be provided in the plant control room, so that testing may be performed outside of the containment area or continuous monitoring performed during normal operation. However, the usual problem in these types of plants is that there is no unused cabling available from the devices to the control room or other remote location, and it is usually too expensive to install new electrical cabling. Further, in nuclear plants it is difficult to obtain authorization to install additional cabling through the containment enclosure. Therefore, while it may be desirable to install permanent data acquisition instrumentation on certain control devices within the plant, the high cost of installing the needed cabling usually prevents it.

Thus, there is a need for a means of transmitting signals from diagnostic equipment and other information-carrying signals over existing electrical cables, usually noisy AC power lines which are already connected to the various control devices. An investigation of commercially available systems to transmit signals over AC power lines revealed that there were no devices available capable of transmitting low frequency (0–1000 Hz) analog information over electrical lines already used for other purposes, such as AC power lines operating at 50 or 60 Hz.

Digital technology has been applied for networking microcomputers with all kinds of home appliances over existing AC power lines, telephone lines, radio or infrared optical links, etc. A discussion of this type of signal transmission may be found in an article entitled "Control Networks for the Home" by F. W. Gutzwiller, published in Machine Design, Oct. 20, 1983, p. 109–112.

Systems are available for limited voice frequency transmission over AC power lines using frequency modulation/demodulation technology for analog signals in the range of from about 500 Hz to 5 kHz. Examples of these types of systems are the Three Channel FM Intercom, Catalog No. F-1010, available from Dick Smith Electronics, Inc., P.0. Box 8021, Redwood City, Calif. 94063; and the Radio Shack, Model No. 43-218 Intercom available from Radio Shack Corp., Fort Worth, Tex. 76102.

None of the above systems are capable of transmitting low frequency analog signals down to DC (0 Hz). To provide a reliable signal transmission system for transmitting signals from diagnostic instrumentation there is a need for an analog transmission system which is capable of transmitting low frequency analog signal information, down to DC, over noisy AC power lines.

SUMMARY OF THE INVENTION

In view of the above need it is an object of this invention to provide a system for the transmission of low frequency analog signals over AC power lines.

Another object of this invention is to provide analog signal transmission system, as in the above object, in which analog signals in the frequency range of from 0 to 1000 Hz may be transmitted over AC power lines using FM modulation techniques.

Other objects and many of the attendant advantages of the present invention will be apparent to those skilled in the art from the following detailed description of the preferred embodiment of the invention taken in conjunction with the drawings.

In summary, the present invention relates to a system for transmitting low frequency analog signals over an AC power line comprising a transmitting means including an FM transmitter capable of being coupled to an AC power line over which the analog signals are to be transmitted by injecting a frequency modulated carrier signal onto the AC line where the modulating signal frequency applied to the input of the transmitter is in a selected frequency band within the operating frequency response band of the FM transmitter, typically within a 1 k to 10 kHz range. The transmitting means further includes an input signal conditioning circuit which converts the low frequency analg input signal to be transmitted, typically varying between 0–5 volts, to a proportionately amplified signal, typically varying between 1–6 volts. This signal is converted by a voltage-to-frequency converter responsive to the amplified signal to generate the modulation signal applied to the input of the FM transmitter which varies over the selected modulating frequency range in proportion to the amplitude of the amplified output signal of the input signal conditioning circuit. A receiving means including an FM receiver capable of being coupled to the AC line and receiving the FM modulated carrier signal and demodulating the signal to reproduce an output signal corresponding in frequency to the modulation signal frequency applied to the FM transmitter. A frequency-to-voltage converter is provided for converting this signal frequency back to an analog signal having a voltage proportional to the modulation signal frequency, thereby reproducing the transmitted analog signal. An output signal conditioning circuit may be used for scaling the reproduced analog signal so that it varies in amplitude over the same range as the low frequency analog input signal applied to the transmitter.

Thus, the transmitting system of this invention shifts the frequency spectrum of the low frequency analog signals, typically of 0–1000 Hz, to be transmitted over the AC power line to a frequency band in which a typical transmitter and receiver used for FM modulation can respond, thereby allow transmission of the signal over an AC power line without interference from the usual noise found on these lines.

DETAILED DESCRIPTION OF THE PREFERRED EMBODIMENT

Figure 1:
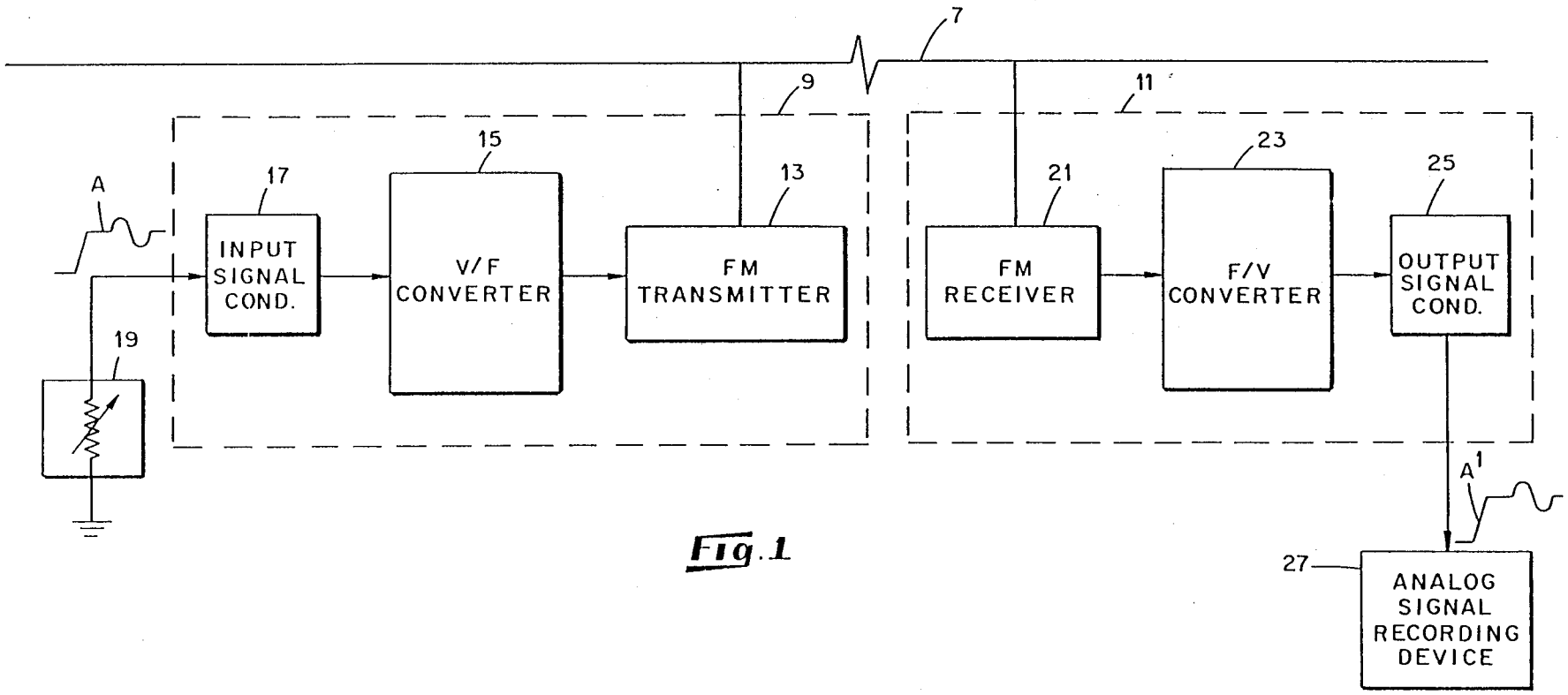
FIG. 1 is a schematic block diagram of a system for transmitting low frequency analog signals over AC power lines according to the present invention.

Referring now to FIG. 1, there is shown a block diagram of a low frequency analog signal transmission system according to the present invention for transmitting analog signals in the frequency range of from about 1 to 1000 Hz over an AC power line 7. The system includes a transmitting section 9 and a receiving section 11. The transmitting section includes a conventional FM modulator/transmitter 12 of the conventional type used to couple FM modulated signals to an AC power line. Although various commerically available transmitters of this type may be used, the transmitter used in the system illustrated herein is one terminal of a Model RS 43-218 power line intercom system available from Radio Shack, Forth Worth, Tex. This system includes a pair of identical units, each forming a terminal, which are connected to a common AC power line feeding power to the units and are capable of both transmitting and receiving at each terminal. The second terminal is used in this system as an FM receiver/demodulator in the receiving section 11 as will be explained hereinbelow. These transmitting/receiving units operate quite well in a narrow audio frequency band between about 500 Hz and 10 kHz and use a speaker which functions as both a speaker and a microphone, depending on whether the unit is transmitting or receiving. These units may be switched to act as a transmitter or a receiver. In the transmitting mode a selected frequency carrier signal, either 160 kHz, 200 kHz or 230 kHz, which is switch selected, is FM modulated by a voice signal from the speaker voice coil. The modulated carrier signal is then coupled to the AC power line through a conventional transformer coupler which superimposes the FM modulated carrier signal onto the AC power line signal.

Alternatively, when switched to act as a receiver, the FM modulated carrier signal is received through the transformer coupler, demodulated and fed to the speaker coil to reproduce the transmitted audio signal. Details of the FM transmitter/receiver units, which are not necessary to be presented here for a complete understanding of the present invention, may be had by referring to the schematic diagram which is supplied with the units when purchased. The only modification to the units necessary for their use in this system is to disconnect the leads to the speaker/microphone, one of which is a ground terminal lead, and make these terminals accessible as the input terminal for the transmitter section 9 unit and as the output terminals for the receiver section 11.

Thus, as shown in FIG. 1, the input to the FM modulator/transmitter 13 is connected to the output of a voltage-to-frequency (V/F) converter 15. The converter converts the voltage amplitude of an analog signal input, over a selected voltage range, to a constant amplitude AC signal having a frequency proportional to the input signal voltage which varies over a selected frequency band corresponding to the FM modulator/-transmitter 13 frequency response band, in this case a band of between about 1–6 kHz. This signal is used to modulate the selected 200 kHz carrier signal produced by the modulator/transmitter 13 and is coupled to the AC power line 7. In order to provide an input signal voltage range of 1–6 volts to the V/F converter 15 and produce the corresponding desired output frequency range of 1–6 kHz, an input signal conditioning circuit 17 is provided which converts the low frequency input analog signal to be transmitted, such as the signal A shown at the input to circuit 17, to a signal having an amplitude in the required 1–6 volt range for the input to the V/F converter 15.

In the application illustrated in FIG. 1, the low frequency analog signal A produced by a low frequency industrial process sensor 19, such as a pressure sensor, current sensor, mechanical motion transducer, etc., typically can be biased to vary over a range of about 0–5 volts. This signal is converted to a corresponding shaped signal varying between 1–6 volts by the input signal conditioning circuit 17 and fed to the V/F converter 15 which converts these low frequency component signals (0–1000 Hz) to a constant amplitude AC signal whose frequency varies over the range of from 1–6 kHz corresponding to the input signal voltage amplitude. Thus, in effect these low frequency transducer signals are frequency shifted to a range corresponding to the response band of the FM modulator/transmitter 13 where they are then used to modulate the carrier signal transmitted over the power line 7.

The power line signal is received by the FM receiver/demodulator 21 of the receiver section 11 which is connected to the power line 7. As pointed out above, the receiver/demodulator 21 is identical to the device used as the FM modulator/transmitter 13 of the transmitter section 9, but switched to act as a receiver circuit and to operate at the same carrier frequency (200 kHz). This circuit demodulates the carrier signal to extract the 1–6 kHz modulation signal carrying the analog signal information. This signal is converted to an analog signal by connecting the output of the receiver/demodulator 21 to the input of a frequency-to-voltage converter 23 which converts the frequency signal to an analog signal which varies in amplitude in proportion to the input signal frequency. This signal may then be scaled to the corresponding amplitude levels (0–5 volts) of the input signal applied to the input of the transmitter section 9 by an output signal conditioning circuit 25. Thus, a low frequncy input signal, such as the signal A, applied to the transmitter section 9 is detected and reproduced as signal A′ at the output of the signal conditioning circuit 25. This signal may be used in various ways depending on the application of the transmission system or recorded in an analog signal recording device 37, as shown in FIG. 1. The recording device may be an oscilloscope to display the transducer 19 output signal, a plotter to record the signal or may take the form of a computer storage device in a signal analysis system to obtain test results from the transducer signals being transmitted. Those skilled in the art will appreciate the various uses which may be made of the system in which remote monitoring or testing of control devices or measurement of process variables may be made by transmitting transducer information or other low frequency signaling over existing AC power lines, control lines, or the like.

Figure 2:
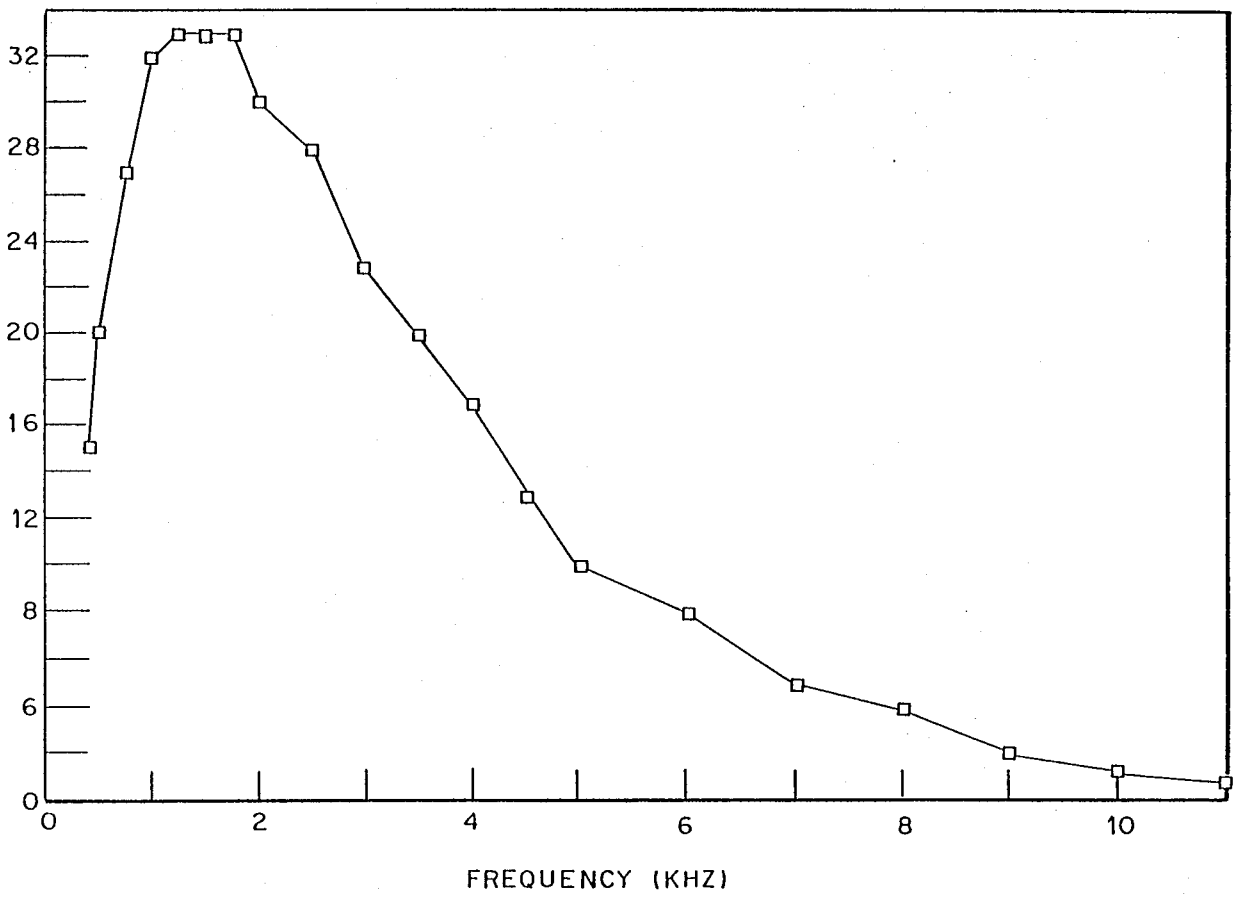
FIG. 2 is a plot of the transfer function ($V_{out}/V_{in}$ vs. Frequency) for a typical FM tranmmitter receiver system for transmission of audio range signals over an AC power line.

Referring now to FIG. 2, there is shown a graph of the transfer function ($V_{out}/V_{in}$) over a modulating signal frequency range of 0–11 kHz for the model RS 43-218 AC power line analog signal transmission system used as the FM transmitter 13 and receiver 21 in FIG. 1. This graph is typical of the response range of an FM transmission system, especially in the low modulation frequency range. As will be noted in the response graph, at the frequencies below about 1 kHz, the range of interest for low frequency signal transmission, the response drops off very rapidly and at frequencies below about 500 Hz it has been found that the signals become buried in noise to the point that they cannot be detected even at short transmission distances over existing AC power lines.

Figure 3:
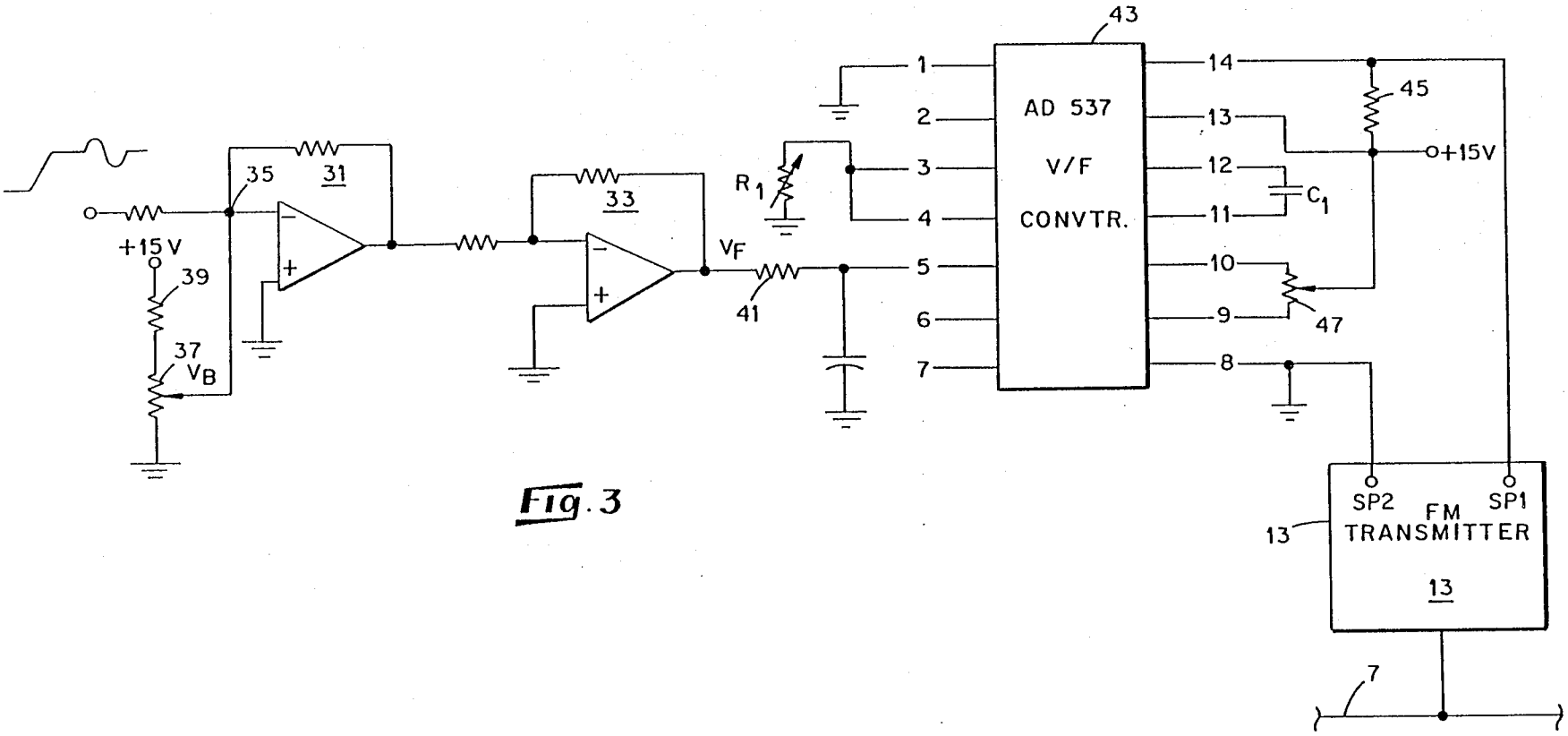
FIG. 3 is a detailed schematic circuit diagram of the transmitting section of the system shown in FIG. 1.

This system, as generally described above with reference to FIG. 1, overcomes the problem of low signal frequency modulation and provides a system which allows frequency modulated transmission of low frequency analog signals, as will now be described in more detail. Referring to FIG. 3, there is shown a detailed schematic circuit diagram of the transmitting section 9 of FIG. 1. The input signal conditioning circuit 17 consists of two signal inverting amplifier stages which are operated at unity gain. The input stage 31 is provided with a bias voltage $V_B$ at the input summing junction 35 such that it is added to the input voltage $V_{in}$ so that output voltage $V_F = V_{in} + V_B$. Thus, an input signal $V_{in}$ which varies over a range of 0–5 volts, in this case the transducer 19 (FIG. 1) output, is converted to an output voltage $V_F$ which varies over a range of 1–6 volts corresponding to variations in the input signal voltage. The bias voltage $V_B$ is selected for the particular application by varying a potentiometer 37 connected in a voltage divider arrangement with a resistor 39 between a 15 volt power supply and ground potential.

The output signal $V_F$ of the input signal conditioning circuit is applied through a resistor 41 to the input pin 5 of an integrated circuit element 43 which is connected as a voltage-to-frequency converter. The converter 43 is preferably a model AD537 supplied by Analog Devices, Inc., Norwood, Mass. In the connection arrangement shown, the circuit provides a selected qutput frequency F at pin 14 for a given input voltage in accordance with the following:

$$F = \frac{V_F}{10(R_1)C_1},$$

where $V_F$ is the input voltage at pin 5 (1–6 volts), $R_1$ is the scaling resistance provided by connecting a selected value resistor between ground and pins 3 and 4, and $C_1$ is the scaling capacitance provided by a capacitor connected between pins 11 and 12. Therefore, by selecting $R_1 = 14.7$ kohms and $C_1 = 6800$ picoforads (pf) an output frequency range of 1–6 kHz is provided over a corresponding input voltage range of 1–6 volts. Thus, the signal at pin 14, which is a constant amplitude signal having a frequency proportional to the systems input signal voltage, is applied to the speaker terminal SP1 of the FM transmitter 13 as explained above with reference to FIG. 1. The ground pin 8 of the converter 43 is connected to the ground terminal SP2 of the transmitter 13. To provide sufficient drive current to the FM transmitter input, the output pin 14 of the converter is connected through a resistor 45 (typically 5 kohms) to the +15 volt supply. The 15 volt supply voltage is also connected to pin 13 and to pins 9 and 10 through a balancing potentiometer 47 to operate the converter 43.

Thus, it will be seen that as the amplitude of the input signal A (FIG. 1) varies, the frequency of the output signal of the converter 43 varies proportionately which is used to modulate the carrier frequency signal of the FM transmitter applied to the AC power line 7. By varying the modulating signal frequency over the range of 1–6 kHz in response to the input signal voltage swing of 0–5 volts, a modulation signal is provided with a frequency range well within the best response band of operation of the FM transmitter as shown in FIG. 2, thereby allowing FM transmission of low frequency analog signals having frequency components of from 0–1000 Hz or higher.

Figure 4:
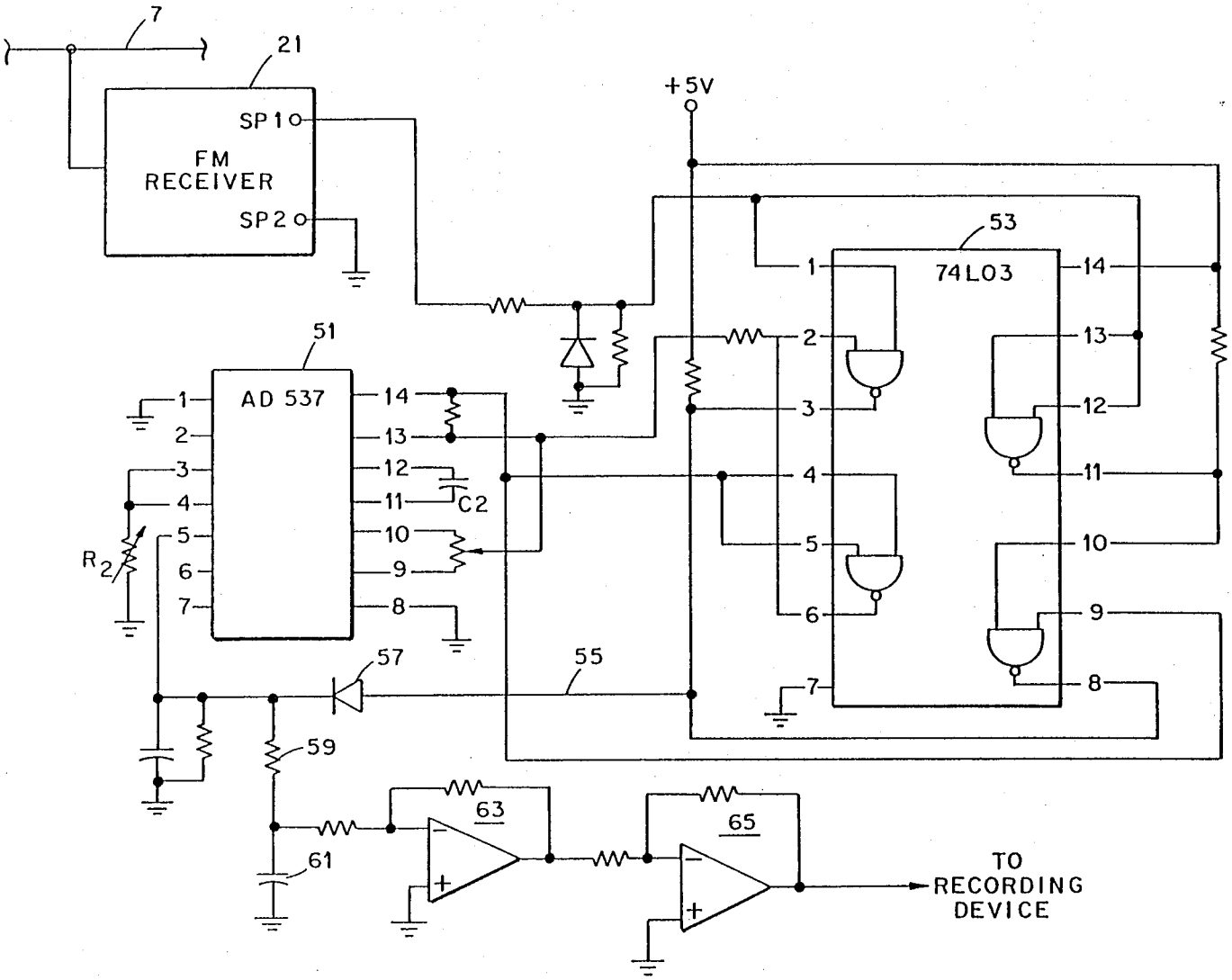
FIG. 4 is a detailed schematic circuit diagram of the receiving section of the system shown in FIG. 1.

Referring now to FIG. 4, wherein there is shown a detailed schematic of the receiver section 11 of the transmission system, the FM signal from the power line 7 is received by the FM receiver 21. It demodulates the carrier signal and provides the modulation signal at the SP1 output. As pointed out above, this signal varies over a frequency range of 1–6 kHz. This signal is converted to an analog signal by the frequency-to-voltage converter 23 which is shown in detail in FIG. 4. In the preferred embodiment the converter consist of essentially two integrated circuit modules 51 and 53, an Analog Devices AD537 identical to that described above for the voltage-to-frequency converter module 43 (FIG. 3) and a 74L03 which includes four NAND gates. The two modules are interconnected to form a phase-locked loop where the freqency-to-voltage converter circuit 51 acts as a voltage controlled oscillation (VCO) and the quad NAND gate arrangement of the integrated circuit 53 is connected to act as a phase comparator. The output signal from the receiver 21 i compared with the output (pin 14) of the voltage-to-frequency converter 51 and produces a feedback beat frequency signal at line 55. This signal is detected and rectified, by a diode 57 connected between the output of circuit 53 and the input (pin 5) of F/V converter 51. The detected feedback signal is averaged by an averaging circuit consisting of a resistor 59 and a capacitor 61 connected between input pin 5 of the F/V converter 51 and ground. This averaged dc voltage is applied to the input of the F/V converter 51 to produce an output signal at pin 14 which has a frequency equal to the frequency of the output signal from the receiver 21. Thus, the V/F converter 51 is forced to track the frequency of the incoming signal from the receiver 21. By selecting the proper values for $R_2$ and $C_2$, as discussed above, the circuit may be forced to operate so that the averaged feedback voltage available across capacitor 61 of the averaging circuit is proportional to the input analog signal voltage A (FIG. 1) being transmitted. This signal is then conditioned by a two stage buffer amplifier including series connected inverting amplifier stages 63 and 65 connected between the ungrounded side of capacitor 61 and the recording device 27 (FIG. 1). Depending upon the application, the buffer amplifer stages may contain appropriate gains to provide the output signal A′ which has an amplitude identical to the input analog signal A.

Thus, it will be seen that a system has been provided for transmitting low frequency analog signals over AC power lines using FM modulation. Although the system has been illustrated by means of a description of a preferred embodiment of the invention, those skills in the art will recognize that various modifications and changes may be made therein without departing from the spirit and scope of the following claims attached to and forming a part of this specification.

We claim:

1. A system for transmitting low frequency analog signals over an AC power line, comprising:

a transmitting circuit means including a frequency modulating transmitter responsive to a modulation signal at an input thereof within a frequency response band of said transmitter for frequency modulating a carrier signal and coupling a resultjng modulated carrier signal to an AC power line and a voltage-to-frequency converter means responsive to said low frequency analog signal for continually converting said analog signal to a signal whose frequency varies in proportion to the amplitude of said analog signal over a frequency range corresponding to said frequency response band of said transmitter at an output thereof connected to the input of said frequency modulating transmitter; and a receiving circuit means including a frequency modulated signal receiver having an input coupled to said AC power line for receiving said modulated carrier signal and demodulating said carrier signal to reproduce said modulation signal at an output thereof and a frequency-to-voltage converter means connected to the output of said frequency modulated signal receiver for continually converting the frequency of said modulation signal at the output of said receiver to a signal having an amplitude proportional to said low frequency analog signal, so that said low frequency analog signal transmitted by said transmitting means is reproduced at the output of said receiving circuit means.

2. The system as set forth in claim 1 wherein said transmitter of said transmitting circuit means includes a frequency modulating transmitter having a modulation signal frequency response band of at least 1 to 10 kHz and wherein said receiver of said receiving circuit means includes a frequency modulated signal receiver having a frequency response band of at least 1 to 10 kHz.

3. The system as set forth in claim 2 wherein said carrier signal frequency is 200 kHz.

* * * * *